United States Patent [19]

Salvo

[11] Patent Number: 4,731,023

[45] Date of Patent: Mar. 15, 1988

[54] TEACHING SYSTEM USING PRERECORDED TAPE

[76] Inventor: Andrew D. Salvo, 10 Gloria Pl., East Haven, Conn. 06512

[21] Appl. No.: 938,254

[22] Filed: Dec. 5, 1986

Related U.S. Application Data

[63] Continuation-in-part of Ser. No. 915,727, Oct. 6, 1986, abandoned, which is a continuation-in-part of Ser. No. 680,802, Dec. 13, 1984, Pat. No. 4,615,682.

[51] Int. Cl.$^4$ .............................................. G09B 7/06
[52] U.S. Cl. .................................. 434/321; 434/335; 434/331; 434/337; 242/188; 242/197; 360/74.6
[58] Field of Search ............... 434/319, 320, 321, 331, 434/335, 337; 242/188, 197; 360/74.6

[56] References Cited

U.S. PATENT DOCUMENTS

| | | | |
|---|---|---|---|
| 2,855,703 | 10/1958 | Stanton | 35/35 |
| 3,222,579 | 12/1965 | Beatenbough et al. | 324/73 |
| 3,660,912 | 5/1972 | Laplume | 35/9 A |
| 3,872,608 | 3/1975 | Laplume | 35/9 A |
| 3,955,466 | 6/1976 | Goldmark | 84/470 |
| 4,343,024 | 8/1982 | Kawai | 360/74.6 |

Primary Examiner—Leo P. Picard
Attorney, Agent, or Firm—Costas & Montgomery

[57] ABSTRACT

A teaching system utilizing prerecorded tape which is prepared in sectors with a message segment and position indicators in the form of transparent windows which are photoelectrically detected. After a message or question is played, a first window is detected by a first detector and the tape drive motor is deenergized with another window positioned before one of a plurality of other detectors. The operator then attempts to answer or identify the message by making a selection corresponding to one of the plurality of detectors, and if a correct answer is given, a signal is given to the operator. All of the photoelectric detecting devices are on a carrier which is removably mounted to a cassette.

9 Claims, 12 Drawing Figures

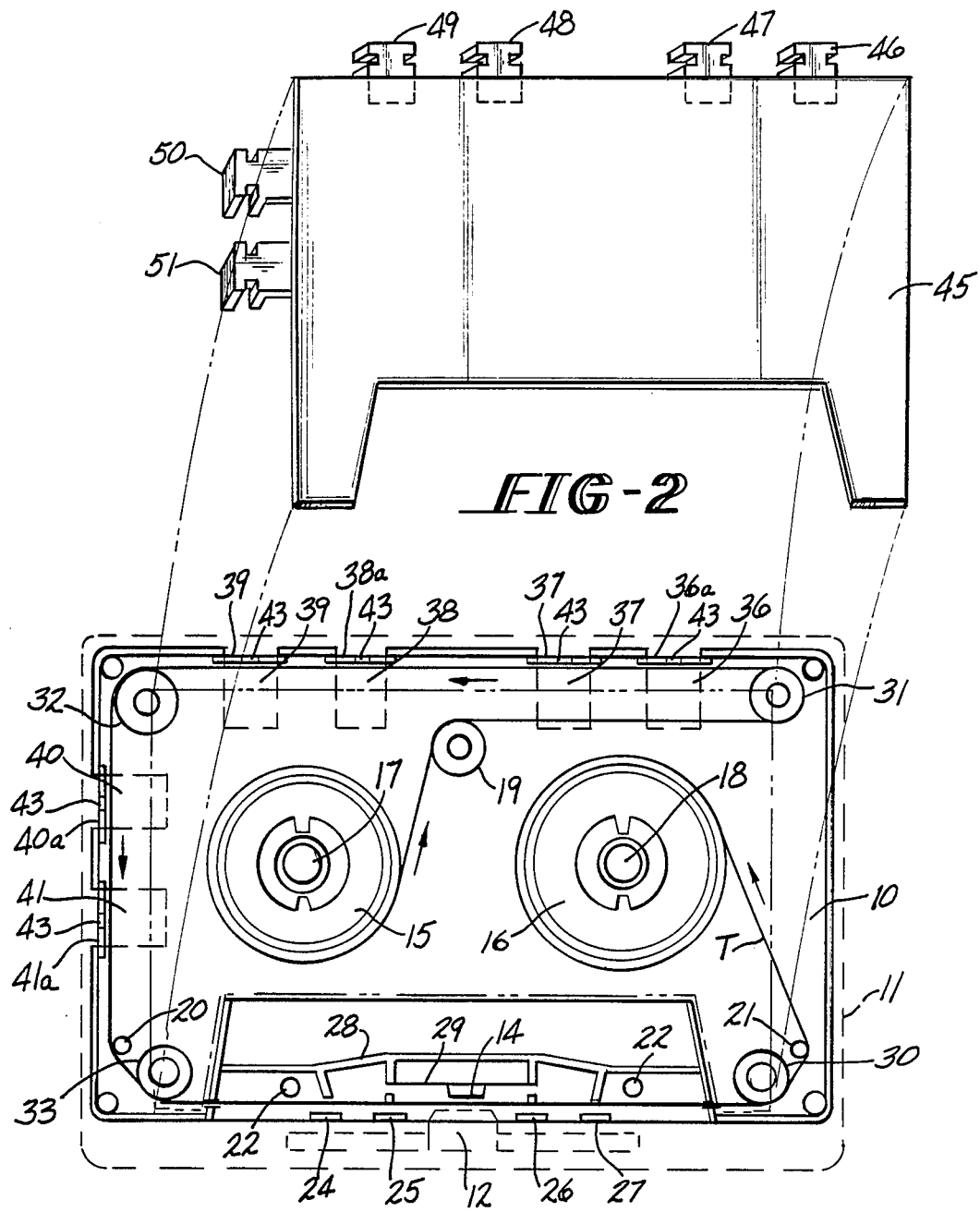
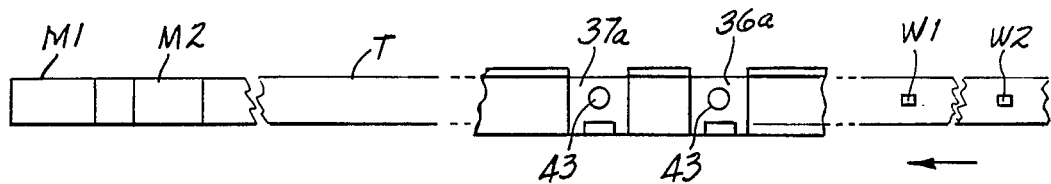

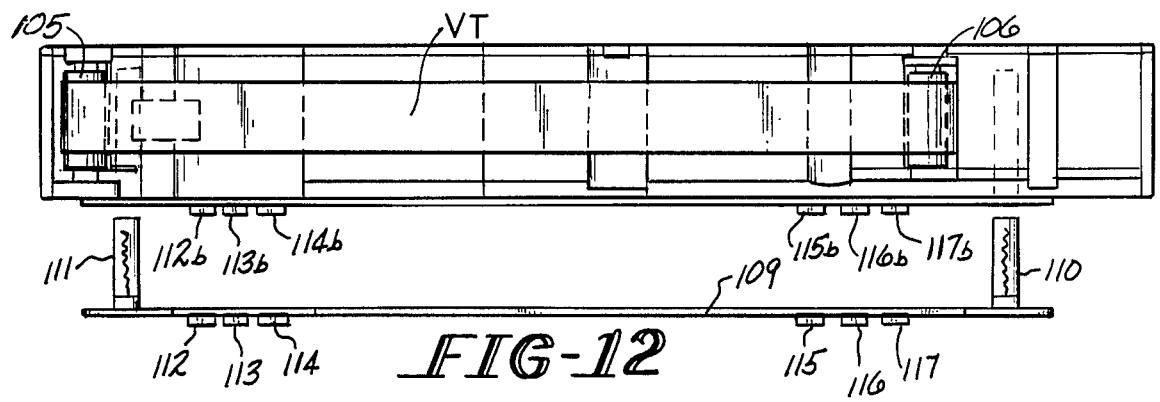
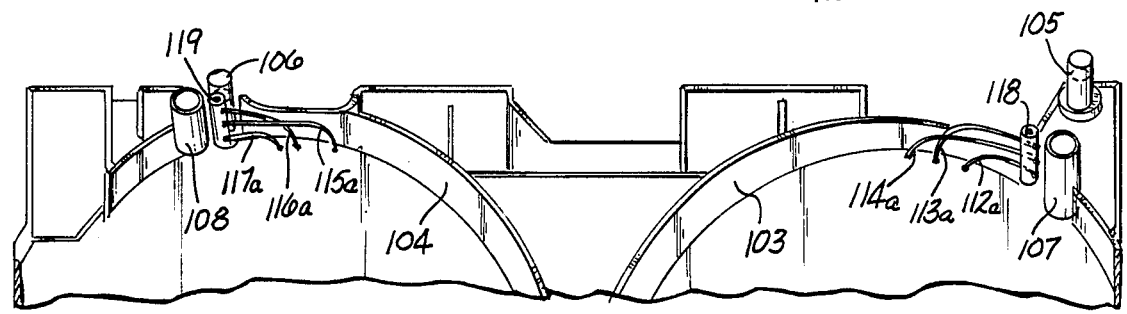
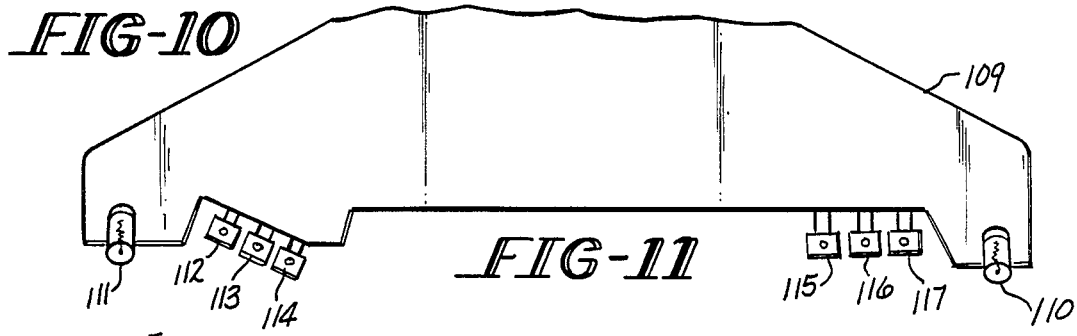
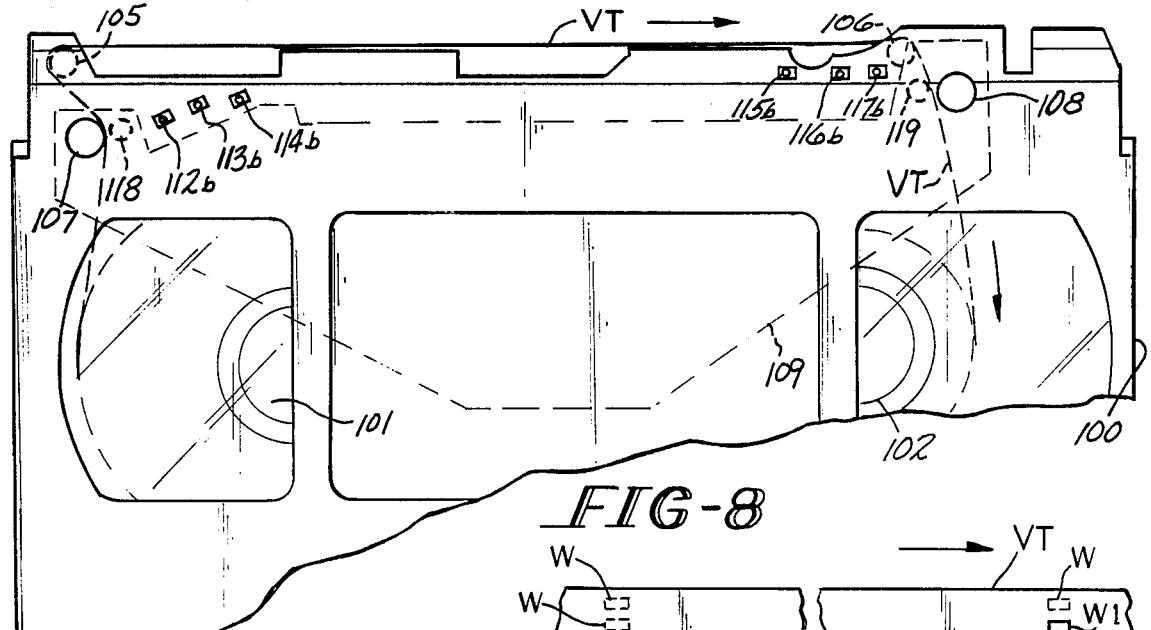
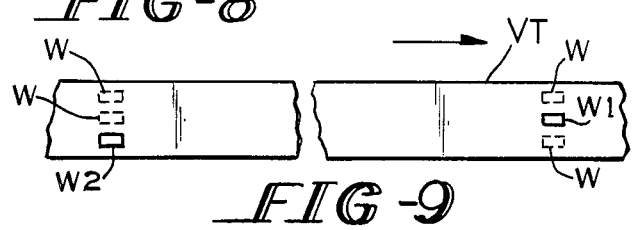

TEACHING SYSTEM USING PRERECORDED TAPE

RELATED APPLICATIONS

This application is a continuation-in-part of application Ser. No. 915,727, filed Oct. 6, 1986 now abandoned, which was a continuation-in-part of application Ser. No. 680,802, filed Dec. 13, 1984, now U.S. Pat. No. 4,615,682.

BACKGROUND OF THE INVENTION

Teaching systems utilizing magnetic tape and a compatible tape playback mechanism have been suggested in the past, for example, U.S. Pat. No. 3,222,597, where instructions are recorded for a technician in step-by-step segments.

U.S. Pat. No. 3,872,608 discloses a teaching machine utilizing a magnetic tape with prerecorded questions and answers in digital code. An answer key generates a digital code which is coincident with a code on a tape and communication is made that the answer is correct. U.S. Pat. No. 3,660,912 discloses a teaching machine utilizing a magnetic tape with prerecorded instructions and questions where the student utilizes a conductive marker to pierce an answer sheet and establish an electrical circuit to respond to a question.

Application Ser. No. 680,802 filed Dec. 13, 1984, now U.S. Pat. No. 4,615,682 issued Oct. 7, 1986 provides a new and improved instructional device wherein sectors of the tape may have a prerecorded message thereon, which message may be in the form of a musical note to be identified, or may be a question. When the message is played, the tape is stopped automatically, the operator selects one of a plurality of identification or selection keys or switches in response to the recorded message. If the operator chooses the correct selection device corresponding to the recorded message, an indication is given of a correct answer, and the operator may then restart the tape drive to attempt to identify or correctly answer the next message in a succeeding sector of the tape.

This system utilizes a prerecorded tape in a cassette and tape player including a drive motor for driving the tape at a playback head. In at least one sector of the tape, there is a message recorded thereon, a plurality of windows for passing light through the tape; the message and each of the windows are predetermined distances from each other along the length of the tape. After the message is played, the first window is detected and in response to such detection of the first window, the tape drive motor is deenergized. A plurality of other detecting means are positioned along the path of the tape and the position of the second window of the tape is selected such that said window is adjacent one of the other detecting means. The system further includes a plurality of operator selection or identification means, each corresponding to one of the other detecting means. Each of the operator selection means may be provided with a code to show an answer or response to the recorded message, and if the operator selects a correct response, a signal is given indicative of the selection of the correct response.

One possible drawback to this system is that electronic circuitry is included in the cassette. Accordingly, the present invention provides an improved system of the type described which has many additional advantages and overcomes the mentioned possible drawback.

SUMMARY OF THE INVENTION

The present invention is similar in general construction and operation to the invention described in U.S. Pat. No. 4,615,682, but includes additional features and improvements. In the present invention, all electrical circuitry is mounted on a carrier which may be fitted to a plurality of different cassettes.

The present invention also provides a more positive technique of stopping the tape at a predetermined location and holding the tape so that the second or answer window is exactly in front of one of the detectors.

An object of this invention is to provide a new and improved teaching or instruction apparatus which is very versatile in use.

Another object of this invention is to provide a simplified teaching system which requires little instruction.

Still another object of this invention is the provision of a new and improved device utilizing photoelectric detectors which is removably fitted to the cassette to detect defined windows on the tape.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

BRIEF DESCRIPTION OF THE DRAWINGS

FIG. 1 is a plan view of a magnetic tape cassette embodying the invention with the top removed;

FIG. 2 is a perspective view of a carrier for photoelectric detectors to be fitted to the cassette of FIG. 1;

FIG. 3 illustrates a segment of magnetic tape utilized in the cassette of FIG. 1;

FIG. 8 is a top plan view of a video cassette in which the invention is embodied with a portion cut away;

FIG. 9 is a view of a section of video tape illustrating the positioning of light transmitting windows therein;

FIG. 10 is a perspective view of a portion of the bottom half of the cassette of FIG. 8;

FIG. 11 is a perspective view of a carrier for lamps and photoelectric detectors adapted to be fitted to the cassette of FIG. 8; and FIG. 12 is an inverted front elevation view of the cassette of FIG. 8 and the carrier of FIG. 9.

DETAILED DESCRIPTION OF PREFERRED EMBODIMENTS OF THE INVENTION

Figure 4:
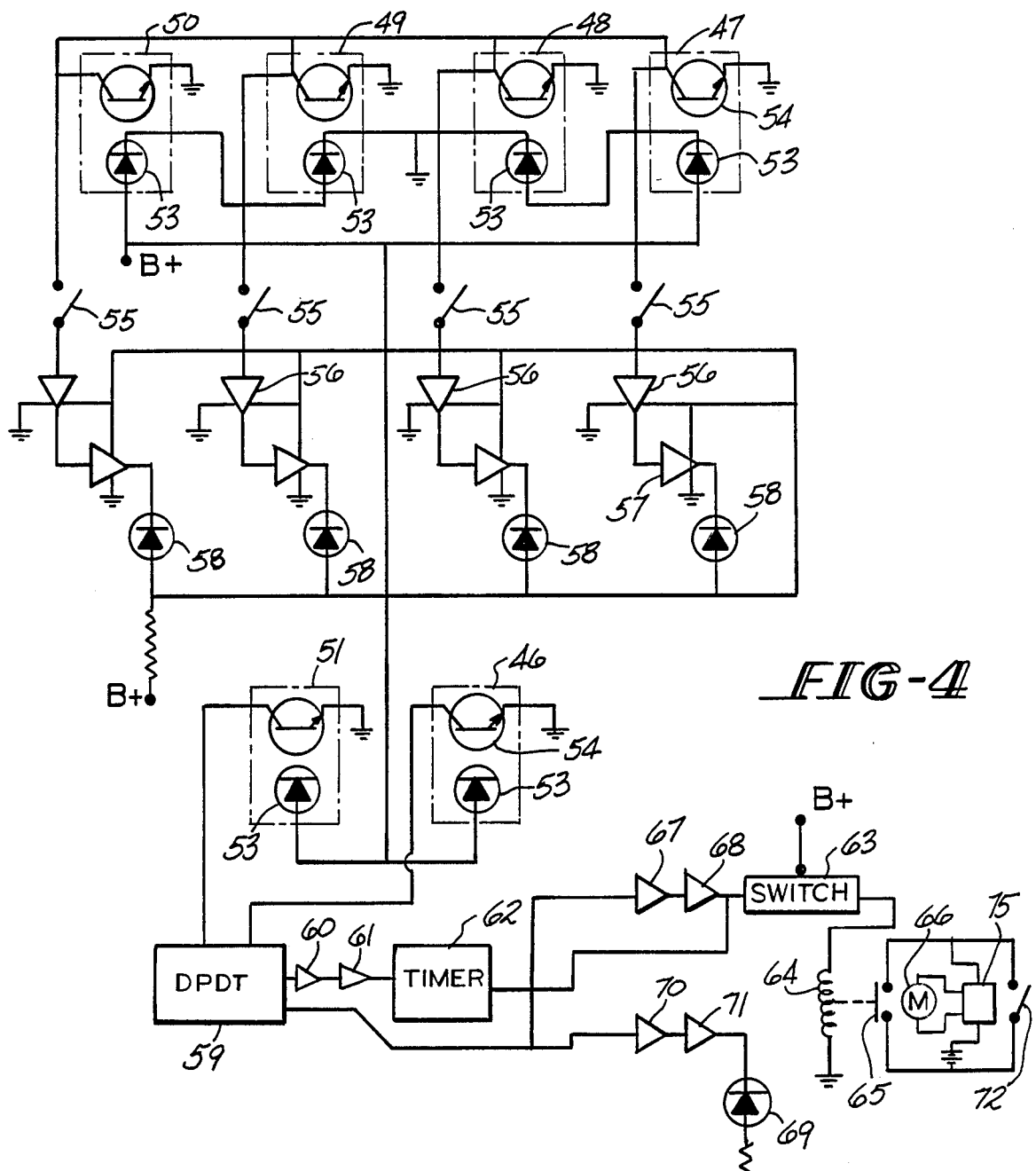
FIG. 4 is a schematic diagram of the electric circuitry utilized in conjuntion with the invention.

Referring now to the drawings, FIG. 1 exemplifies a magnetic tape cassette 10 constructed in accordance with the invention with the top removed. The cassette 10 is shown as included in a cassette player having a receptable indicated by the broken line 11 in which there is a playhead mechanism 12 which is movable into and from engagement with a tape T in the cassette against a pressure pad 14.

The cassette as shown includes a payoff reel 15 and a takeup reel 16, each of which is mounted on capstans 17 and 18, respectively, of the cassette player.

As shown in FIG. 1, the cassette 10 is viewed from the normal top side and the capstan 18 is the drive capstan driven by a motor of the tape player.

The cassette 10 in FIG. 1 is shown with one-half removed. The cassette includes the usual guide pins 20 and 21, receptacles 22 for receiving locating pins, guide tangs 24, 25, 26 and 27, which guide the tape before the pressure pad 14, a stiffening structure 28, and a strip of resilient material 29, which holds pressure pad 14. The cassette is modified by the addition of tape guide members 30, 31, 32, 33, 34 and 35 to define the paths of the tape T, as shown. As the tape T leaves payoff reel 15, it travels about guide members 19, 31, 32, and 33, past the head 12, guide member 30, pin 21 and to takeup reel 16.

The cassette is modified or formed with six cut-outs 36, 37, 38, 39, 40 and 41 in both the upper and lower halves of the cassette body, which provide access to the tape along its path of travel. The inside of the edges of the cassette at the cut-outs 36-41 receive guide members 36a-41a, respectively.

Each of the guide members have a small aperture 43 therein to permit transmittal of light therethrough as hereinafter explained. It will be noted that the path of the tape is closely adjacent the members 36a-41a as the tape passes about guide members 33, 32 and 31.

As hereinafter more fully explained in detail, there may be sections of tape T which have messages or questions recorded thereon and windows defined in the tape. As shown in FIG. 3, the tape has two message segments on there, M1 and M2 followed by two windows W1 and W2. Positioning is such that after the message segments M1 and M2 have passed the head 12, window W1 will be in registry with the aperture 43 of member 36a, and window W2 will be a predetermined distance from window W1, as hereinafter explained.

Reference is now made to FIG. 2 which shows a carrier 45 for a plurality of photo detectors 46, 47, 48, 49, 50 and 51. Carrier 45 is adapted to be placed on top of the cassette with the photo detectors 46-51 having a transmitter and a receiver on either side of the guides 36a-41a, respectively. Electrical leads (not shown in FIG. 2) are taken from the detectors 46-51 to a logic circuit which is hereinafter described.

Briefly stated, when window W1 coincides with aperture 43 of guide 36, detector 46 will sense this and supply a signal which initiates a predetermined timing cycle which is sufficient for window W1 to move to a photo detector. At the end of the timing cycle, the motor is deenergized and just prior to the window W1 coming into registry with another aperture 43 in guide 41.

When this occurs, the motor is locked out. Window W2 is positioned in front of another aperture 43 and light will be transmitted therethrough by another one of photo detectors 46-51.

Assuming the message segments contained a question which was audibly posed to the operator, the operator would then select an appropriate answer by depressing a switch associated with one of the photo detectors. If the operator selects the correct answer, an appropriate indication will be given.

The first message segment M1 will pose a question while the second message segment M2 may give possible answers as in a multiple choice question.

It will be noted that unlike the system of U.S. Pat. No. 4,615,682, there is no electrical or electronic equipment within the cassette. The photo detectors 46-51 are mounted on the removable carrier 45, which fits on top of the cassette and positions the photo detectors 46-51 with respect to all of the windows 43 in the guide members 36-41, and the carrier 45 may be utilized with a plurality of different cassettes.

The student, or user, will then close a switch corresponding to one of photo detector 47-50 in response to the question or test, and will be informed if the answer is correct, as hereinafter explained.

Reference is now made to the schematic diagram of FIG. 4. Each of the photo detectors 46-51 comprises a light emitting diode 53 and a photo detector 54. The detectors 54 of each of photo conductors 47-50 are connected through a switch 55, and a pair of inverters 56, 57 to a light emitting diode 58. In each case, the circuits of photo detectors 47-50 are identical, and only the circuitry connected to photo detector 47 is described. Light, if incident upon a detector 54, will produce a signal if a closed circuit exists. Considering the photo detector 46, and the tape sector of FIG. 2, when window W1 is detected by photo detector 46, the emitter 54 of detector 46 goes to ground. This low signal is applied to one pole of a double pole double throw switch DPDT 59 which applies a high output to inverters 60 and 61 which applies a high output to the input of a second inverter 61. The low output of inverter 61 initiates a timing cycle by a timer 62.

After a predetermined time, timer 62 will emit a pulse to a switch 63. Switch 63 will energize a relay coil 64 which will drop out its contact 65 and deenergize cassette player drive motor 66.

The timing period of timer 62 is chosen such that the pulse is emitted just before window W1 reaches detector 51. Then, when the inertia of the tape carries window W1 to detector 51, the other output of DPDT 59 will be applied to inverters 67 and 68, switch 63 will be held on and relay 64 continuously energized. Motor 66 is thus held in a deenergized state. The message segments M1 and M2 are positioned with respect to window W1 so that immediately after the messages are played, window W1 is sensed by detector 51.

An indication that the tape has stopped is given by light emitting diode 69. Diode 69 is connected to DPDT 59 by through inverters 70 and 71. When the output of inverter 71 goes low, diode 69 is illuminated.

When the tape drive motor is deenergized, window W2 (FIG. 2) will be positioned in between the emitter 53 and detector 54 of one of photo detectors 47-50, and the emitter of the photo detector goes to ground. If a selection switch 55 is closed, the input to an inverter 56 goes to ground and the output of a second inverter 57 also goes to ground. A light emitting diode 58 will then conduct and illuminate, if the correct answer has been chosen.

After a selection is made through one of switches 55, the tape drive motor may be restarted by momentarily closing a switch 72 connected across tape drive motor 58. As window W1 leaves photo detector 51, the output of inverter 67 goes low, the output of inverter 68 goes high, switch 63 opens, relay 64 is deenergized and its contact 65 closes across motor 66.

Figure 5:
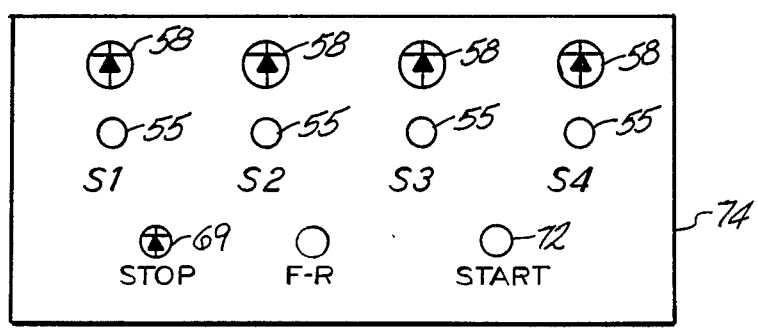
FIG. 5 is a view of an operator selection board utilized in conjunction with the invention.

Reference is now made to FIG. 5, which exemplifies an operator console or control panel 74, which may be included in the tape player or may be external thereto. The panel 74 includes the four light emitting diodes 58. Light emitting diode 69, when illuminated, will indicate that the tape is stopped and the operator should make a selection. Panel 67 further includes motor start switch 72 which the operator may close to restart the motor 58. The start switch 72 need only be depressed briefly.

Prior to restarting motor 66, the operator will make a selection by closing one of the switches 55. In the present example, if the operator closes the switch 59 associated with photo detector 39, the associated light emitting diode (LED) 62 will illuminate and indicate to the operator that the operator has chosen the correct answer. The possible selections are indicated as S1-S4 with respect to the four switches 55.

A coded overlay sheet, not shown, may be placed on or over the panel of FIG. 5, to indicate the choice of selections.

Also included on panel 74 is the control F-R for DPDT switch 59. This permits the functions of detectors 46 and 51 to be reversed when the tape is reversed by changing the state of DPDT 59. Usually, included in a cassette player is an automatic reverse switch which is indicated by reference numeral 75 in FIG. 4. When the tape direction is reversed, the operator merely changes the state of DPDT switch 59.

The invention has been practiced in teaching a student to recognize the interval between two musical notes. Consider the message segments to be the notes C and E. Then one of the switches 59 would be coded for the interval Major 3rd, and the other switches coded for other intervals. If the student properly identifies the interval, the LED 55 associated with properly selected switch 55 will be illuminated. The number and type of questions or problems which may be presented to an operator is unlimited.

Figure 6:
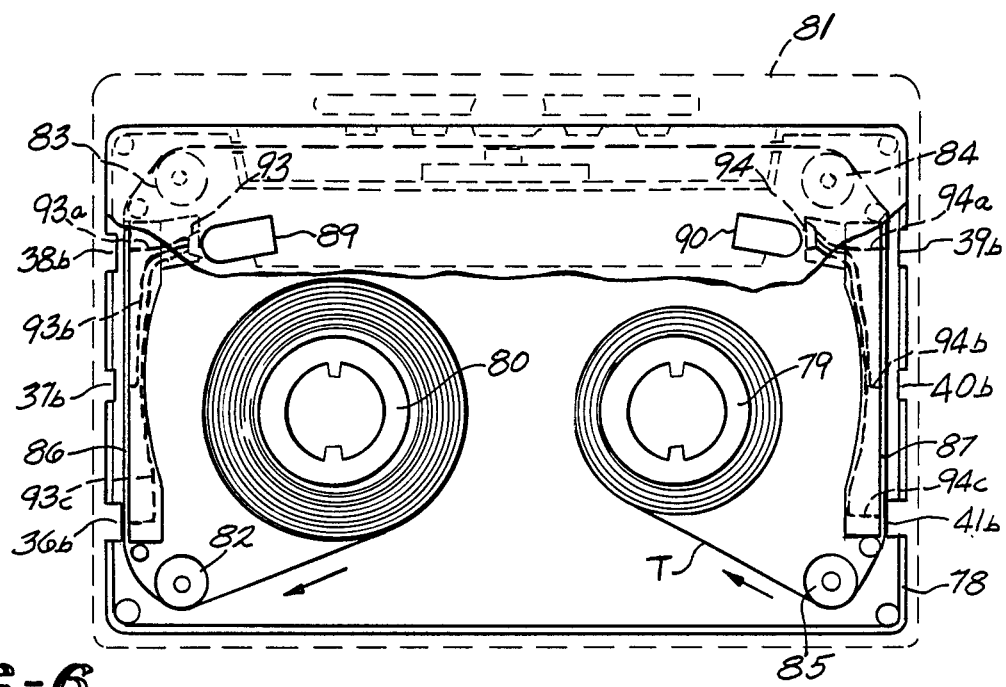
FIG. 6 is a top plan view of another magnetic tape cassette embodying the invention with the top cover partially cut away.
Figure 7:
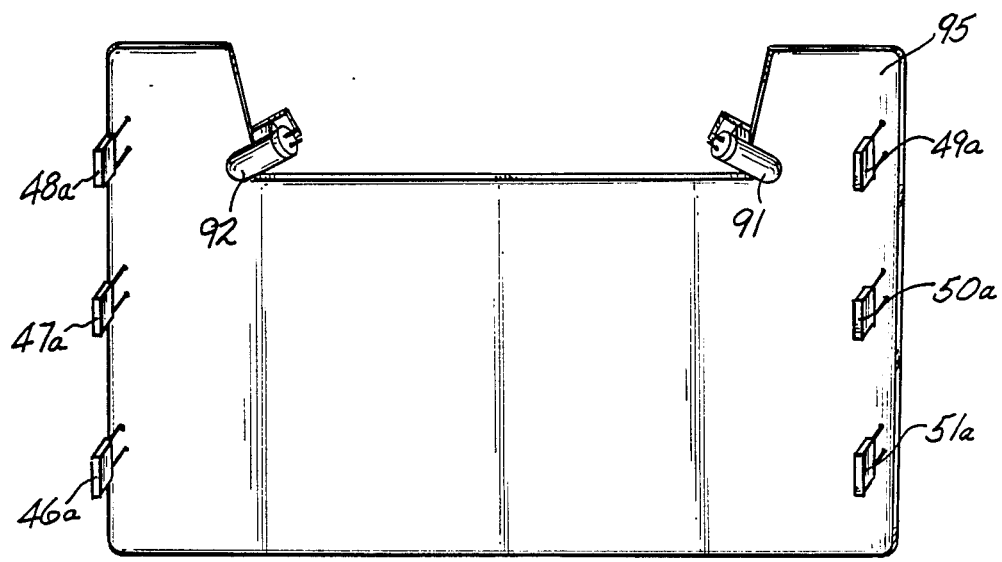
FIG. 7 is a perspective view of a carrier for lamps and photoelectric detectors adapted to be fitted to the cassette of FIG. 6.

FIG. 6 shows a cassette 78 with the top partially removed to show a takeup reel 79 and a payoff reel 80. The cassette 78 is shown as being received in the housing of a cassette playback/recorder 81 which is shown in dotted line. This housing is the same as exemplified in FIG. 1, and no further description is required. In this embodiment, tape T leaves the payoff reel, and travels about guide members 82, 83, 84 and 85 to the takeup reel 79. It will be understood that the terms "takeup" and "takeoff" may be used interchangeably between the reels 79 and 80 in view of the direction of travel of the tape.

The cassette 78 is modified or formed with six cutouts: 36b, 37b, 38b, 39b, 40b and 41b, three on each side along the path of travel of the tape T to expose the tape. Guide members 86 and 87 are positioned on either side of the cassette along the path of the tape. The guide members 86 and 87 have apertures therein (not shown) similar to the apertures 43 in the guide members 36a-41a of FIG. 1.

Defined in the cassette are apertures 89 and 90 adapted to receive therein lamps 91 and 92 as shown on a carrier 95 shown in FIG. 5. Positioned adjacent the apertures for the lamps 91 and 92 are support members 93 and 94.

Extending from each of the support members 93 and 94 are three fibre optics 93a, 93b, and 93c; 94a, 94b, and 94c. The fibre optics 93a, 93b and 93c lead from support member 93 to the apertures in guide member 86 adjacent each of cutouts 36b, 37b and 38b. The fibre optics 94a, 94b and 94c lead to the apertures in guide member 87 adjacent each of cutouts 39b, 40b and 41b, respectively. The fibre optics are vertically spaced apart in each of support members 93 and 94 and transmit light from their associated lamps.

In operation, carrier 95 of FIG. 5 is placed on the cassette 78 with the lamps 91, and 92 being received in apertures 89 and 90, respectively, to provide light to the optical fibres 93 and 94. Such light is transmitted by the optical fibre 93a, 93b, 93c, and 94a, 94b, and 94c, to the apertures in guide members 86 and 87.

Associated with and mounted to carrier 95 are light detectors 46a-51a each adapted to be received in one of the cutouts 36a-41b and sense any light passing through the tape T from one of the optical fibres. The circuitry on carrier 95 of FIG. 5 or in circuit with detectors 46a-51a and lamps 91 and 92 is essentially the same as shown in FIG. 4, the only difference being that the light emitting diodes 53 are replaced by the optical fibres. The circuit structure and function is otherwise the same as described in conjunction with FIG. 4. The lamps 91 and 92 are energized by a B+ line, the same as applied to the light emitting diodes 53 of FIG. 4.

The invention may also be embodied in video equipment so that the questions may be presented visually as well as audibly. For example, a question with multiple choice answers may be presented visually and/or audibly and the operator chooses an answer through one of the switches 55.

FIG. 8 exemplifies a video cassette 100 having reels 101 and 102 showing the video tape VT traveling from 101 to reel 102 by virtue of a tape drive of a video cassette recorder (not shown). A section of video tape VT is shown n FIG. 9. This section of tape VT is shown with six possible window positions. However, in actual practice, only two windows W1 and W2 will be utilized, as exemplified by windows W1 and W2 in full line. The first window W1 is the stop window following the prerecorded message, and the second window W2 is positioned in accordance with the answer to the question. The positions W shown in broken line are possible window positions.

FIG. 10 is an inverted perspective view of a portion of the cassette with the bottom half removed. The cassette includes arcuate walls 103 and 104 which define chambers for the reels 101 and 102 and the tape thereon. Tape guides 105 and 106 are provided. Tape guides 105 and 106 are plastic cylinders received on studs (not shown) moulded on the cassette sections. The cassette is modified by the provision of transparent cylindrical members 107 and 108 which provide openings in the bottom wall of the cassette. A carrier member 109 (FIG. 11) has mounted thereon two lamps 110 and 111, which are adapted to be inserted in the transparent cylinders 107 and 108, respectively, when the carrier member is mounted to the cassette. The carrier further includes photo electric sensors 112-117. The cassette is further modified for provision of two upright support members 118 and 119 adjacent cylindrical members 107 and 108. Each of the support members has extending therethrough three optic fibres 112a, 113a and 114a in support member 118, 115a, 116a, and 117a, and 119a in support member 119. The optic fibres are positioned to receive any light emanating from the lamps 110 and 111 when the carrier 109 is mounted to the cassette and a window in the tape VT permits passage of light therethrough. The optic fibres lead from their support members to the bottom wall of the cassette where the ends thereof 112b-117b are positioned so as to be in registry with photodetectors 112-117 on carrier 109, and so as to be in light transmitting relation with respect to each of the photodetectors when the carrier 19 is mounted to the cassette 100.

In operation, the video cassette embodying the invention is placed in a video cassette recorder which is in operative relation with a television set, and the carrier 109 is then mounted thereto. The stop window W1 passes the end of a fibre optic, a timing sequence will be initiated as previously described, and the cassette drive motor will be deenergized when the timer times out, at which time, the stop window will be adjacent another fibre optic and its related photo detector, and the drive motor locked out. At this time, a second window will provide communication of light from another fibre optic to its associated detector. The operator then closes one of the answer switches 55 to select the answer to the question that has been posed. If the correct answer has been selected, the appropriate diode 58, as shown in FIG. 5, will be illuminated. The operator may then push the START switch for the next question.

The layout of the message segments from the video tape is the same as exemplified in FIG. 3.

The circuitry of carrier 109 of the video cassette is essentially the same as shown in FIG. 4, the only difference being that the light emitting diodes 53 are replaced by the optic fibres.

FIG. 12 exemplifies how the cassette may be modified to have the carrier 109 bottom mounted.

It may thus be seen that the objects of the invention set forth, as well as those made apparent from the foregoing description, are efficiently attached. While preferred embodiments of the invention have been set forth for purposes of disclosure; however, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. An educational system comprising a prerecorded tape and a tape player including a drive motor for driving said tape and a playback head,
   said tape including at least one sector which has a message recorded thereon and two windows for passing light through the tape, said message sector and said windows being at predetermined distances from each other,
   first means photoelectric detecting means positioned along the path of the tape for photoelectrically detecting one of said windows and deenergizing said drive motor,
   a plurality of other photoelectric detecting means positioned along the path of said tape, the position of said second window in said tape being selected such that said second window is adjacent one of said other detecting means when said one of said windows is detected by said second detecting means, and
   a plurality of operator selection means, each corresponding to one of said other detecting means, the recorded message posing a question or choice of selection to the operator, and means for indicating that operation of one of said selection means corresponds to said detecting means adjacent said second window,
   said tape being in a cassette, said photoelectric detecting means being mounted on a removable carrier which may be fitted to said cassette with said photoelectric detecting means positioned to detect said windows in said tape.

2. The system of claim 1 wherein said carrier has light emitting means thereon, a transparent receptacle in said cassette adapted to receive said light emitting means, a plurality of light transmitting means in said cassette having one end adjacent said receptacle and other ends in predetermined spaced relationship on said cassette, said carrier having light detecting means thereon adapted to register with the other ends of said light transmitting means when said carrier is mounted to said cassette.

3. The system of claim 2 where said cassette has openings therein exposing said tape to said photoelectric detecting means.

4. The system of claim 1 where said tape is in a cassette, said cassette having openings therein exposing said tape, said carrier having said light detecting means thereon positioned to detect windows in said tape at said openings.

5. An educational system including a prerecorded tape and a tape player including a drive motor for driving said tape and a playback head,
   said tape including at least one sector which has a message recorded thereon and two windows for passing light through the tape, said message sector and said windows being at predetermined distances from each other,
   first means photoelectric detecting means positioned along the path of the tape for photoelectrically detecting one of said windows and deenergizing said drive motor a predetermined time after the recorded message has passed said head,
   second photoelectric detecting means positioned along the path of the tape for detecting said one window after said predetermined time and providing a signal which holds said motor in a deenergized state,
   a plurality of other photoelectric detecting means positioned along the path of said tape, the position of said second window in said tape being selected such that said second window is adjacent one of said other detecting means when said one of said windows is detected by said second detecting means, and
   a plurality of operator selection means, each corresponding to one of said other detecting means, the recorded message posing a question or choice of selection to the operator, and means for indicating that operation of one of said selection means corresponds to said detecting means adjacent said second window.

6. The system of claim 5 where said tape is in a cassette, said cassette has openings therein exposing said tape, said photoelectric detecting means are on a removable carrier which may be fitted to said cassette with said photoelectric detecting means in said openings to detect said windows in said tape.

7. The system of claim 5 wherein said drive motor for said tape is reversible, and switching means are provided for reversing the function of said first and second photoelectric detecting means.

8. The system of claim 5 wherein said carrier has light emitting means thereon, a transparent receptacle in said cassette adapted to receive said light emitting means, a plurality of light transmitting means in said cassette having one end adjacent said receptacle and other ends in predetermined spaced relationship on said cassette, said carrier having light detecting means thereon adapted to register with the other ends of said light transmitting means when said carrier is mounted to said cassette.

9. The system of claim 8 where said cassette has openings therein exposing said tape to said photoelectric detecting means.

* * * * *